(12) United States Patent  (10) Patent No.: US 8,719,168 B2
Murphy et al.  (45) Date of Patent: May 6, 2014

(54) SILENT SIGN-IN FOR OFFLINE GAMES

(75) Inventors: Andrew M. Murphy, Seattle, WA (US);
 Yasser B. Asmi, Redmond, WA (US);
 Alice P. Steinglass, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 12/952,000

(22) Filed: Nov. 22, 2010

(65) Prior Publication Data

US 2011/0065501 A1  Mar. 17, 2011

Related U.S. Application Data

(63) Continuation of application No. 10/800,331, filed on Mar. 12, 2004, now Pat. No. 7,857,701.

(51) Int. Cl.
 *G06F 21/00* (2013.01)
 *G06Q 20/00* (2012.01)

(52) U.S. Cl.
 USPC .......................................................... 705/51

(58) Field of Classification Search
 USPC .............. 705/51, 16, 21, 512, 59, 71; 380/44, 380/262, 278, 279
 See application file for complete search history.

(56) References Cited

U.S. PATENT DOCUMENTS

| | | |
|---|---|---|
| 4,009,343 A | 2/1977 | Markey et al. |
| 4,009,344 A | 2/1977 | Flemming et al. |
| 4,009,345 A | 2/1977 | Flemming et al. |
| 4,009,346 A | 2/1977 | Parker et al. |
| 4,009,347 A | 2/1977 | Flemming et al. |
| 4,261,039 A | 4/1981 | Baker et al. |
| 4,279,199 A | 7/1981 | Blanco et al. |
| 4,290,138 A | 9/1981 | Bare et al. |
| 4,304,497 A | 12/1981 | Cavill et al. |
| 4,353,298 A | 10/1982 | Baker et al. |
| 4,353,653 A | 10/1982 | Zimmerman |
| 4,452,136 A | 6/1984 | Boynton et al. |
| 4,654,656 A | 3/1987 | Deaver et al. |
| 4,893,307 A | 1/1990 | McKay et al. |
| 4,970,640 A | 11/1990 | Beardsley et al. |
| 4,979,105 A | 12/1990 | Daly et al. |
| 5,021,949 A | 6/1991 | Morten et al. |
| 5,107,496 A | 4/1992 | Cook et al. |
| 5,113,496 A | 5/1992 | McCalley et al. |
| 5,113,522 A | 5/1992 | Dinwiddie, Jr. et al. |

(Continued)

OTHER PUBLICATIONS

"AOL Instant Messenger", at <<http://web.archive.org/web/20010818081919/http://www.aol.com.au/site/website/aolprodu..>>, AOL Australlia Online Services, 2001, pp. 1-2.

(Continued)

*Primary Examiner* — Dante Ravetti
(74) *Attorney, Agent, or Firm* — Bryan Webster; Andrew Sanders; Micky Minhas (57) ABSTRACT

Techniques are disclosed to silently sign in a user of an offline game title onto an online service. The user is afforded access to select online services to facilitate future online gaming. In a described implementation, a method is disclosed. The method silently signs in a user of an offline game title onto an online gaming service. As a result, the signed-in user may receive one or more online services such as an in-game notification, a friend request (e.g., inviting a user to become a friend), a cross-title game invitation, and/or data corresponding to a friends list.

19 Claims, 7 Drawing Sheets

(56) References Cited

U.S. PATENT DOCUMENTS

| | | | |
|---|---|---|---|
| 5,144,692 | A | 9/1992 | Baker et al. |
| 5,155,809 | A | 10/1992 | Baker et al. |
| 5,197,069 | A | 3/1993 | Cook et al. |
| 5,220,654 | A | 6/1993 | Benson et al. |
| 5,257,368 | A | 10/1993 | Benson et al. |
| 5,283,868 | A | 2/1994 | Baker et al. |
| 5,297,262 | A | 3/1994 | Cox et al. |
| 5,309,448 | A | 5/1994 | Bouloutas et al. |
| 5,325,517 | A | 6/1994 | Baker et al. |
| 5,363,497 | A | 11/1994 | BAker et al. |
| 5,369,749 | A | 11/1994 | Baker et al. |
| 5,369,767 | A | 11/1994 | Dinwiddie, Jr. et al. |
| 5,386,512 | A | 1/1995 | Crisman et al. |
| 5,388,215 | A | 2/1995 | Baker et al. |
| 5,423,006 | A | 6/1995 | Brown et al. |
| 5,504,861 | A | 4/1996 | Crockett et al. |
| 5,553,287 | A | 9/1996 | Bailey et al. |
| 5,615,329 | A | 3/1997 | Kern et al. |
| 5,632,681 | A | 5/1997 | Bakogulu et al. |
| 5,652,914 | A | 7/1997 | Eckert et al. |
| 5,659,786 | A | 8/1997 | Georgel et al. |
| 5,664,219 | A | 9/1997 | Glassen et al. |
| 5,701,502 | A | 12/1997 | Baker et al. |
| 5,734,818 | A | 3/1998 | Kern et al. |
| 5,832,218 | A | 11/1998 | Gibbs et al. |
| 5,923,756 | A | 7/1999 | Shambroom |
| 6,001,015 | A * | 12/1999 | Nishiumi et al. .............. 463/38 |
| 6,240,174 | B1 | 5/2001 | Silver |
| 6,241,612 | B1 | 6/2001 | Heredia |
| 6,385,737 | B1 | 5/2002 | Benignus et al. |
| 6,406,371 | B1 * | 6/2002 | Baba et al. ...................... 463/42 |
| 6,411,623 | B1 | 6/2002 | DeGollado et al. |
| 6,457,879 | B1 | 10/2002 | Thurlow et al. |
| 6,468,160 | B2 | 10/2002 | Eliott |
| 6,487,208 | B1 | 11/2002 | Chirashnya et al. |
| 6,560,720 | B1 | 5/2003 | Chirashnya et al. |
| 6,578,054 | B1 | 6/2003 | Hopmann et al. |
| 6,601,195 | B1 | 7/2003 | Chirashnya et al. |
| 6,636,958 | B2 | 10/2003 | Abboud et al. |
| 6,712,704 | B2 | 3/2004 | Eliott |
| 6,769,989 | B2 | 8/2004 | Smith et al. |
| 6,807,562 | B1 | 10/2004 | Pennock et al. |
| 2001/0009868 | A1 * | 7/2001 | Sakaguchi et al. .............. 463/42 |
| 2002/0006197 | A1 * | 1/2002 | Carroll et al. .................... 380/44 |
| 2002/0028706 | A1 * | 3/2002 | Barnard et al. ................. 463/26 |
| 2002/0062350 | A1 | 5/2002 | Maehiro |
| 2002/0086732 | A1 * | 7/2002 | Kirmse et al. ................... 463/42 |
| 2002/0112189 | A1 * | 8/2002 | Syvanne et al. ............... 713/201 |
| 2002/0128068 | A1 | 9/2002 | Whitten et al. |
| 2002/0142842 | A1 | 10/2002 | Easley et al. |
| 2003/0119540 | A1 * | 6/2003 | Mathis ........................... 455/518 |
| 2003/0149781 | A1 * | 8/2003 | Yared et al. .................... 709/229 |
| 2004/0111621 | A1 * | 6/2004 | Himberger et al. ........... 713/182 |
| 2004/0143734 | A1 * | 7/2004 | Buer et al. ..................... 713/153 |
| 2004/0162137 | A1 | 8/2004 | Eliott |
| 2004/0166942 | A1 * | 8/2004 | Muir ................................ 463/43 |
| 2007/0073207 | A1 * | 3/2007 | Sindel et al. ..................... 602/27 |

OTHER PUBLICATIONS

Hall, "ConsolePro centralizes useful tools for most of your file server chores", InfoWorld, Jun. 30, 1997, pp. #60B-pp. #60D.

"Help for AOL Instant Messenger", retrieved on Jan. 28, 2008, at <<http://web.archive.org/web/20020202010817/http://www.aim.com/help_faq/inux/latest_linux.adp>>, pp. 1-6.

"Help for AOL Instant Messenger", retrieved on Jan. 23, 2008, at <<http://web.archive.org/web/20010311192847/http://www.aol.com.au/site/website/aolprodu . . . >>, pp. 1-4.

Hermida, "Xbox Live put to the test", BBC News, World Edition, Technology, Feb. 23, 2004, pp. #1-pp. #4.

UtahSaint, "Xbox Live—Broadband Providers Ready!", retrived at <<http://www.xbox365.com/news.cgi?id=EpFypkFFuphLzSbls3340>>, published Oct. 30, 2002, pp. #1-pp. #3.

* cited by examiner

SILENT SIGN-IN FOR OFFLINE GAMES

CROSS-REFERENCE TO RELATED APPLICATION

This application is a continuation application of, and claims priority to, U.S. patent application Ser. No. 10/800,331, filed on Mar. 12, 2004, entitled "Silent Sign-In for Offline Games," the entire disclosure of which is incorporated herein by reference.

TECHNICAL FIELD

The present invention generally relates to gaming systems and, more particularly, to silent sign-in for offline games.

BACKGROUND

Traditionally, gaming systems accommodated a limited number of players, such as 1-4 players. A recent trend in gaming systems is to provide capabilities to facilitate gaming among multiple players over a network, such as Internet-based online gaming. These online gaming systems allow players to compete with other players, regardless of their geographic location.

The game titles available on the market today can be generally classified into two categories. The first category is online games which allow a user to play the game against one or more players online. The users may build a list of preferred online players (or friends' list). The users may also send and receive messages (such as invitations to play the online game). The second category is offline games that are generally played by one or more users with access to the same game console only.

One shortcoming of today's game titles and online services is that if a user is playing an offline game, that user is excluded from receiving online messages such as an invitation to play an online game. This limits a user's ability to play against a preferred group of players.

SUMMARY

Techniques are disclosed to silently sign in a user of an offline game title onto an online service. The user is afforded access to select online services to facilitate future online gaming.

In a described implementation, a method includes silently signing in a user of an offline game title onto an online gaming service. As a result, the signed-in user may receive one or more online services (e.g., an in-game notification, a game invitation, a friend request (e.g., inviting a user to become a friend), and/or data corresponding to a friends list).

In another described implementation, an apparatus (such as a game console) includes an interface configured to communicate with an online game service via a public network (such as the Internet). The apparatus further includes a processor coupled to the interface. The processor may be configured to silently sign in a most recently signed-in user of the apparatus. After the signing in, the user is capable of receiving online services.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes the silent sign-in for offline game titles. The signing-in (also referred to as logging-in herein) affords the user access to select online services such as an in-game notification, a cross-title game invitation, a friend request (e.g., inviting a user to become a friend), and/or data corresponding to a friends list which are traditionally only available to online titles with a signed-in user. Such access enables a gamer to readily switch from an offline game to an online game when the situation changes (e.g., a friend signs-in or issues an invitation to play an online game). Silently signing in generally indicates that a user of a console is automatically signed onto an online service without requiring action by a user of a console in an implementation.

Online Gaming Environment

Figure 1:
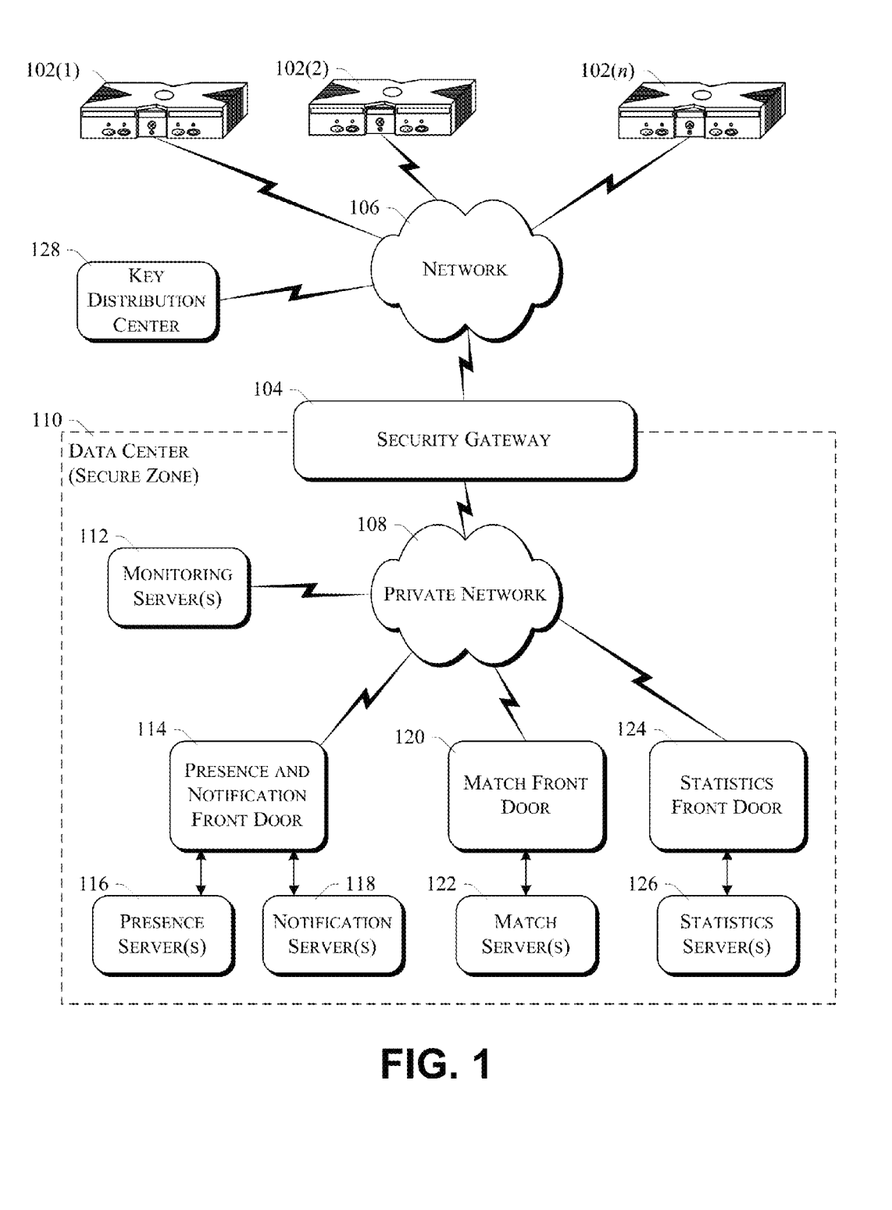
FIG. 1 is a block diagram of an exemplary online gaming environment.

FIG. 1 is a block diagram of an exemplary online gaming environment 100. Multiple game consoles 102(1), 102(2), ... 102(n) are coupled to a security gateway 104 via a network 106. Network 106 represents any one or more of a variety of conventional data communications networks. Network 106 will typically include packet switched networks, but may also include circuit switched networks. Network 106 can include wired and/or wireless portions. In one exemplary implementation, network 106 includes the Internet and may optionally include one or more local area networks (LANs) and/or wide area networks (WANs). At least a part of network 106 is a public network, which refers to a network that is publicly-accessible. Virtually anyone can access the public network.

In some situations, network 106 includes a LAN (e.g., a home network), with a routing device situated between game console 102 and security gateway 104. This routing device may perform network address translation (NAT), allowing the multiple devices on private network 108 (or a LAN) to share the same IP address on the Internet, and also operating as a firewall to protect the device(s) from access by malicious or mischievous users via the Internet.

Security gateway 104 operates as a gateway between public network 106 and private network 108. Private network 108 can be any of a wide variety of conventional networks, such as a local area network. Private network 108, as well as other devices discussed in more detail below, is within a data center 110 that operates as a secure zone. Data center 110 is made up of trusted devices communicating via trusted communications. Thus, encryption and authentication within secure zone 110 is not necessary. The private nature of network 108 refers to the restricted accessibility of network 108—access to network 108 is restricted to only certain individuals (e.g., restricted by the owner or operator of data center 110).

Security gateway 104 is a cluster of one or more security gateway computing devices. These security gateway computing devices collectively implement security gateway 104. Security gateway 104 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 110 are: one or more monitoring servers 112; one or more presence and notification front doors 114, one or more presence servers 116, and one or more notification servers 118 (collectively implementing a presence and notification service); one or more match front doors 120 and one or more match servers 122 (collectively implementing a match service); and one or more statistics front doors 124 and one or more statistics servers 126 (collectively implementing a statistics service). The servers 116, 118, 122, and 126 provide services to game consoles 102, and thus can be referred to as service devices. Other service devices may also be included in addition to, and/or in place of, one or more of the servers 116, 118, 122, and 126. Additionally, although only one data center is shown in FIG. 1, alternatively multiple data centers may exist with which game consoles 102 can communicate. These data centers may operate independently or alternatively may operate collectively (e.g., to make one large data center available to game consoles 102).

Game consoles 102 are situated remotely from data center 110, and access data center 110 via network 106. A game console 102 desiring to communicate with one or more devices in data center 110 establishes a secure communication channel between the console 102 and security gateway 104. Game console 102 and security gateway 104 encrypt and authenticate data packets being passed back and forth, thereby allowing the data packets to be securely transmitted between them without being understood by any other device that may capture or copy the data packets without breaking the encryption. Each data packet communicated from game console 102 to security gateway 104, or from security gateway 104 to game console 102 can have data embedded therein. This embedded data is referred to as the content or data content of the packet. Additional information may also be inherently included in the packet based on the packet type (e.g., a heartbeat packet or traversal packet, discussed in more detail below).

The secure communication channel between a console 102 and security gateway 104 is based on a security ticket. Console 102 authenticates itself and the current user(s) of console 102 to a key distribution center 128 and obtains, from key distribution center 128, a security ticket. Console 102 then uses this security ticket to establish the secure communication channel with security gateway 104. In establishing the secure communication channel with security gateway 104, the game console 102 and security gateway 104 authenticate themselves to one another and establish a session security key that is known only to that particular game console 102 and the security gateway 104. This session security key is used as a basis to encrypt data transferred between the game console 102 and the security gateway cluster 104, so no other devices (including other game consoles 102) can read the data. The session security key is also used as a basis to authenticate a data packet as being from the security gateway 104 or game console 102 that the data packet alleges to be from. Thus, using such session security keys as a basis, secure communication channels can be established between the security gateway 104 and the various game consoles 102.

Once the secure communication channel is established between a game console 102 and the security gateway 104, encrypted data packets can be securely transmitted between the two. When the game console 102 desires to send data to a particular service device in data center 110, the game console 102 encrypts the data and sends it to security gateway 104 requesting that it be forwarded to the particular service device(s) targeted by the data packet. Security gateway 104 receives the data packet and, after authenticating and decrypting the data packet, encapsulates the data content of the packet into another message to be sent to the appropriate service via private network 108. Security gateway 104 determines the appropriate service for the message based on the requested service(s) targeted by the data packet.

Similarly, when a service device in data center 110 desires to communicate data to a game console 102, the data center sends a message to security gateway 104, via private network 108, including the data content to be sent to the game console 102 as well as an indication of the particular game console 102 to which the data content is to be sent. Security gateway 104 embeds the data content into a data packet, and then encrypts the data packet so it can only be decrypted by the particular game console 102 and also authenticates the data packet as being from the security gateway 104.

Although discussed herein as primarily communicating encrypted data packets between security gateway 104 and a game console 102, alternatively some data packets may be partially encrypted (some portions of the data packets are encrypted while other portions are not encrypted). Which portions of the data packets are encrypted and which are not can vary based on the desires of the designers of data center 110 and/or game consoles 102. For example, the designers may choose to allow voice data to be communicated among consoles 102 so that users of the consoles 102 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, the data packet is still authenticated.

Each security gateway device in security gateway 104 is responsible for the secure communication channel with typically one or more game consoles 102, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 112 operate to inform devices in data center 110 of an unavailable game console 102 or an unavailable security gateway device of security gateway 104. Game consoles 102 can become unavailable for a variety of different reasons, such as a hardware or software failure, the console being powered-down without logging out of data center 110, the network connection cable to console 102 being disconnected from console 102, other network problems (e.g., the LAN that the console 102 is on malfunctioning), etc. Similarly, a security gateway device of security gateway 104 can become unavailable for a variety of different reasons, such as hardware or software failure, the device being powered-down, the network connection cable to the device being disconnected from the device, other network problems, etc.

Each of the security gateway devices in security gateway 104 is monitored by one or more monitoring servers 112, which detect when one of the security gateway devices becomes unavailable. In the event a security gateway device becomes unavailable, monitoring server 112 sends a message to each of the other devices in data center 110 (servers, front doors, etc.) that the security gateway device is no longer available. Each of the other devices can operate based on this information as it sees fit (e.g., it may assume that particular game consoles being managed by the security gateway device are no longer in communication with data center 110 and perform various clean-up operations accordingly). Alternatively, only certain devices may receive such a message from the monitoring server 112 (e.g., only those devices that are concerned with whether security gateway devices are available).

Security gateway 104 monitors the individual game consoles 102 and detects when one of the game consoles 102 becomes unavailable. When security gateway 104 detects that a game console is no longer available, security gateway 104 sends a message to monitoring server 112 identifying the unavailable game console. In response, monitoring server 112 sends a message to each of the other devices in data center 110 (or alternatively only selected devices) that the game console is no longer available. Each of the other devices can then operate based on this information as it sees fit.

Presence server(s) 116 holds and processes data concerning the status or presence of a given user logged in to data center 110 for online gaming. Notification server(s) 118 maintains multiple queues of outgoing messages destined for a player logged in to data center 110. Presence and notification front door 114 is one or more server devices that operate as an intermediary between security gateway 104 and servers 116 and 118. One or more load balancing devices (not shown) may be included in presence and notification front door 114 to balance the load among the multiple server devices operating as front door 114. Security gateway 104 communicates messages for servers 116 and 118 to the front door 114, and the front door 114 identifies which particular server 116 or particular server 118 the message is to be communicated to. By using front door 114, the actual implementation of servers 116 and 118, such as which servers are responsible for managing data regarding which users, is abstracted from security gateway 104. Security gateway 104 can simply forward messages that target the presence and notification service to presence and notification front door 114 and rely on front door 114 to route the messages to the appropriate one of server(s) 116 and server(s) 118.

Match server(s) 122 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 120 includes one or more server devices (and optionally a load balancing device(s)) and operates to abstract match server(s) 122 from security gateway 104 in a manner analogous to front door 114 abstracting server(s) 116 and server(s) 118.

Statistics server(s) 126 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 126 includes one or more server devices (and optionally a load balancing device(s)) and operates to abstract statistics server(s) 126 from security gateway 104 in a manner analogous to front door 114 abstracting server(s) 116 and server(s) 118.

Thus, it can be seen that security gateway 104 operates to shield devices in the secure zone of data center 110 from the untrusted, public network 106. Communications within the secure zone of data center 110 need not be encrypted, as all devices within data center 110 are trusted. However, any information to be communicated from a device within data center 110 to a game console 102 passes through security gateway cluster 104, where it is encrypted in such a manner that it can be decrypted by only the game console 102 targeted by the information.

Overview of Silent Sign-in

Figure 2:
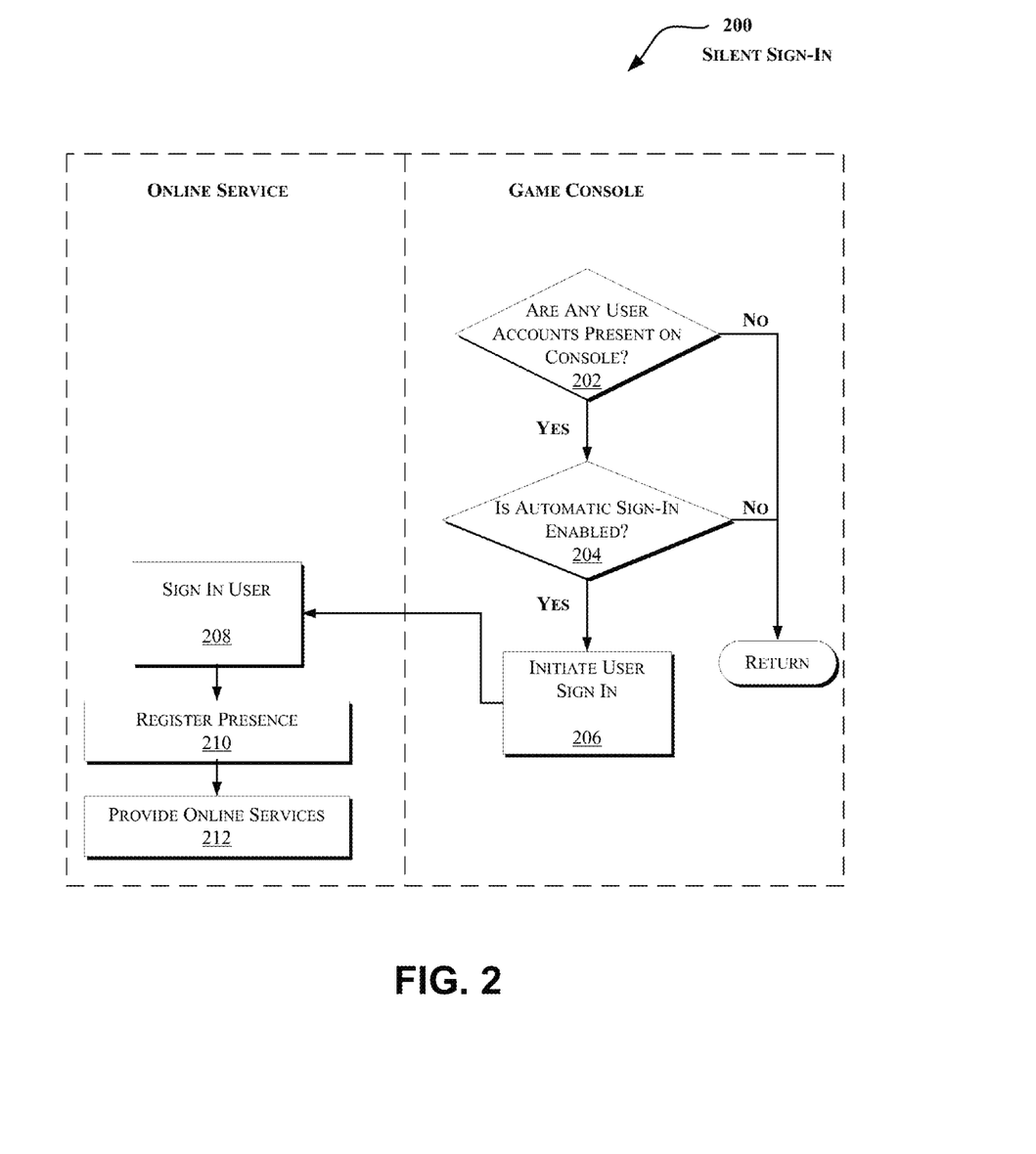
FIG. 2 illustrates an exemplary method summarizing the acts performed by a game console and online service when silently signing in an offline game title.

FIG. 2 illustrates an exemplary method 200 summarizing the acts performed by a game console and online service when silently signing in an offline game title. Silently signing in generally indicates that a user of a console (such as the console 102 of FIG. 1) is automatically signed in to an online service (such as those discussed with reference to the data center 110 of FIG. 1). The automatic sign-in process requires no action by a user of a console in one implementation.

In an implementation, each stage discussed with reference to the method 200 is performed by a console (such as the console 102 of FIG. 1) or an online service (such as that discussed with reference to the data center 110 of FIG. 1). Also, each stage may be performed by software, hardware, firmware, or combinations thereof. The method includes a stage 202 which determines whether any user online accounts are present on the console. If an account is present, a stage 204 determines whether automatic sign-in is enabled on the console. Automatic sign-in may be enabled in a corresponding user-configurable setting (such as a dash settings or stored profile data). If either stages 202 or 204 fail, the method 200 will return to a previous state.

Otherwise, if the stage 204 determines that automatic sign-in is enabled, the saved user information is utilized to sign in the user (as initiated by the game console (206) and completed by the online service (208)). After the user successfully signs into the online service, a stage 210 registers the presence of the user online and the user is provided with online services (212). In one implementation, the stage 210 may be performed by the presence server(s) 116 of FIG. 1.

Exemplary User Interfaces

Figure 3:
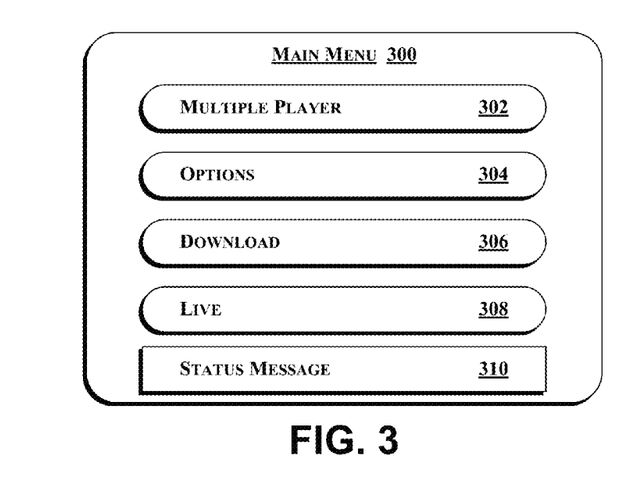
FIG. 3 illustrates an exemplary user interface (UI) for a main menu.

FIG. 3 illustrates an exemplary user interface (UI) for a main menu 300. The main menu 300 may be generated by a game title running on a console such as the console 102 of FIG. 1. The main menu 300 may be displayed initially by a game title. Additionally, the main menu 300 may be displayed on a display device attached to a console such as the console 102 of FIG. 1. The main menu 300 includes one or more buttons (or menu entries) to allow a user to interact with the console. The buttons may include a multiple player button 302 to permit more than one player to play a game, an options button 304 to navigate the user to a screen for selection of options, a download button 306 to download data (such as programs, scores, screens, skins, etc.), and a live button 308 to enable a user to go online.

The main menu 300 may also include a status message window 310 to display messages regarding the status of the game or console. For example, the status message may indicate any of the following: no user account present, automatic sign-in disabled, signing in, not signed in, signed in, and the like.

In one implementation, selecting the live button brings up either (a) a friends drop in UI (e.g., to enable communication with player on a friends list such as that discussed with reference to FIG. 4), or (b) if a sign in or connection error has occurred, displays the drop-in (1 player) sign in UI (this may then allow the user to sign in and/or troubleshoot their connection). In an implementation, the latter option requires a user to enter an authorization code (such as a passcode). If a connection error occurs after sign in has successfully occurred (e.g., a cable is unplugged) and the user subsequently clicks on the live button 308, the user will be brought to the sign in screen. The sign in process and/or the account information associated therewith (as will be further discussed with reference to FIG. 7) may be encrypted. Also, the account information may be transferred to another game console (e.g., through storing the data on a memory unit of a game controller such as those discussed with reference to FIG. 11).

In turn, if a sign in succeeds, this may be indicated in the status message window 310 on the main menu 300. Thereafter, selecting the live button 308 will bring the user to the friends screen (discussed with reference to FIG. 4) or some other area such as the sign in menu discussed with reference to FIG. 6. If sign-in fails (for any reason—connectivity or passcode related), this may again be indicated in the status message window 310. Thereafter, in an implementation, selecting the live button 308 will bring the user to the sign in screen—trying to sign in will bring the user to either a request for passcode or the network troubleshooter.

Figure 4:
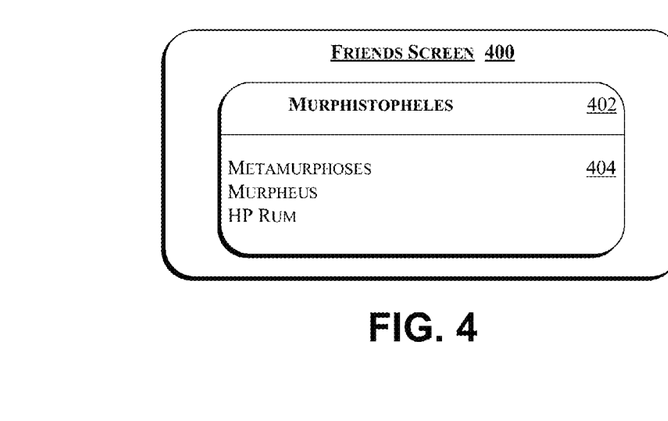
FIG. 4 illustrates an exemplary UI for a friends screen.

FIG. 4 illustrates an exemplary UI for a friends screen 400. The friends screen 400 may be generated by a game title running on a console (such as the console 102 of FIG. 1) and may include information provided by an online server (such as those discussed with reference to the data center 110 of FIG. 1). As shown, the screen 400 may display the name of the user who is signed in (402) and the name of friends (404) and the respective status of each friend, e.g., online, offline, what game they are playing, whether they are voice enabled, and the like (not shown). The user of the screen 400 may send his/her friend(s) a game invite by clicking on their name (e.g., in 404).

Figure 5:
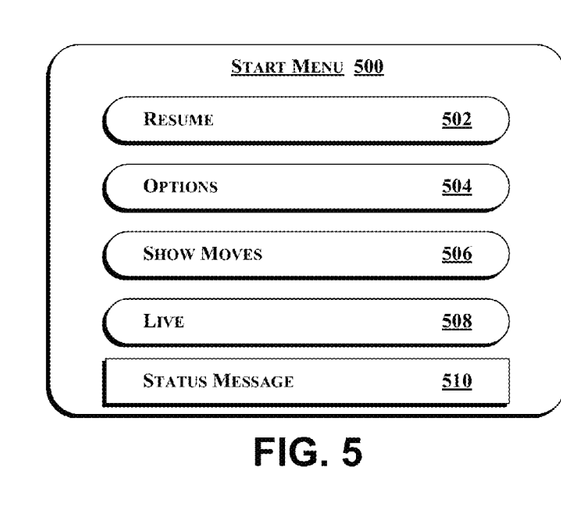
FIG. 5 illustrates an exemplary UI for a start menu.

FIG. 5 illustrates an exemplary UI for a start menu 500. The start menu 500 may be displayed once a user presses the "start" button on a game controller. The start menu 500 may be generated by a game title running on a console (such as the console 102 of FIG. 1). The start menu 500 includes a resume button 502 (e.g., to navigate to a previous state such as a game), an options button 504 (such as 304 of FIG. 3), a show moves button 506 (e.g., to display a series of most recent moves of a select game), a live button 508 (such as 308 of FIG. 3), and a status message window 510 (such as 310 of FIG. 3).

Figure 6:
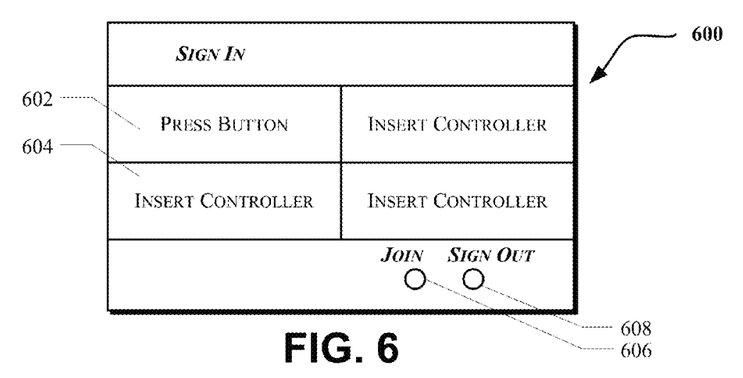
FIG. 6 illustrates an exemplary sign-in screen.

FIG. 6 illustrates an exemplary sign-in screen 600. In one implementation, the sign-in screen 600 may be generated by a console (such as discussed with reference to the main menu 300). The sign-in screen 600 may be initiated upon insertion of a game title into a console (such as the console 102 of FIG. 1). The sign-in screen may be divided based on the number of users the game supports (e.g., based on information provided by the game title). For example, the sign-in screen of FIG. 6 has an activated portion 602 and three inactive portions (such as 604). The sign-in screen further includes a button 606 for joining the game (which may also be displayed on the activate portion 602) and a sign-out (also referred to as log-out herein) button 608 for signing out of the game. Pressing the button 606 signs the user in, in an implementation.

Figure 7:
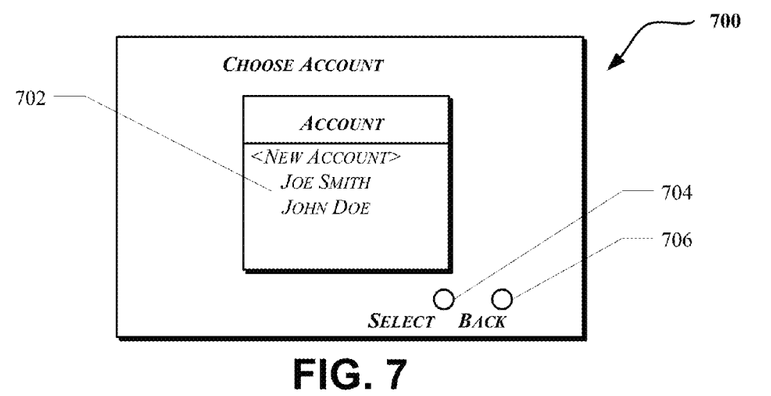
FIG. 7 illustrates an exemplary account information screen.

FIG. 7 illustrates an exemplary account information screen 700. All current accounts on the console and/or any attached memory units (MUs) may be listed (702) on the account information screen 700. In one implementation, the list 702 may be arranged in the following order: accounts most recently logged, guest, and new account(s) (e.g., in order of creation). The list 702 may be scrollable and a select button 704 allows selection of a given account. A back button 706 allows return to a previous menu or state. In an implementation, the account information screen 700 may be invoked by pressing the button 606 of FIG. 6 (e.g., to join a game).

Figure 8:
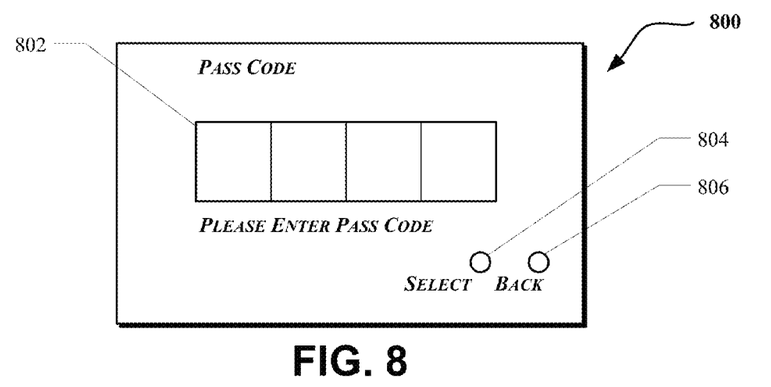
FIG. 8 illustrates an exemplary passcode entry screen.

FIG. 8 illustrates an exemplary passcode entry screen 800. After selecting an account in the screen of FIG. 7, a user may enter the passcode in portion 802 of FIG. 8. A select button 804 allows the user to indicate that the passcode entry is completed and a back button 806 permits return to a previous menu or state.

In an implementation, a game sends the following information when logging on:

LogonType—this indicates what kind of logon to perform (e.g., silent (won't use any UI—or associated memory for logon), normal, RetrievedLogonState (won't use any logon UI or associated memory for logon), RetrievedGameInvite (e.g., to retrieve a game invite));

LogonUserCount—the number of users who can be logged on simultaneously in the game;

LogonServiceIDs—the services the game needs; and

DisplayConnectionErrors—to display errors that occur during the game, e.g., losing a network connection.

More Detailed Silent Sign-in Process

Figure 9:
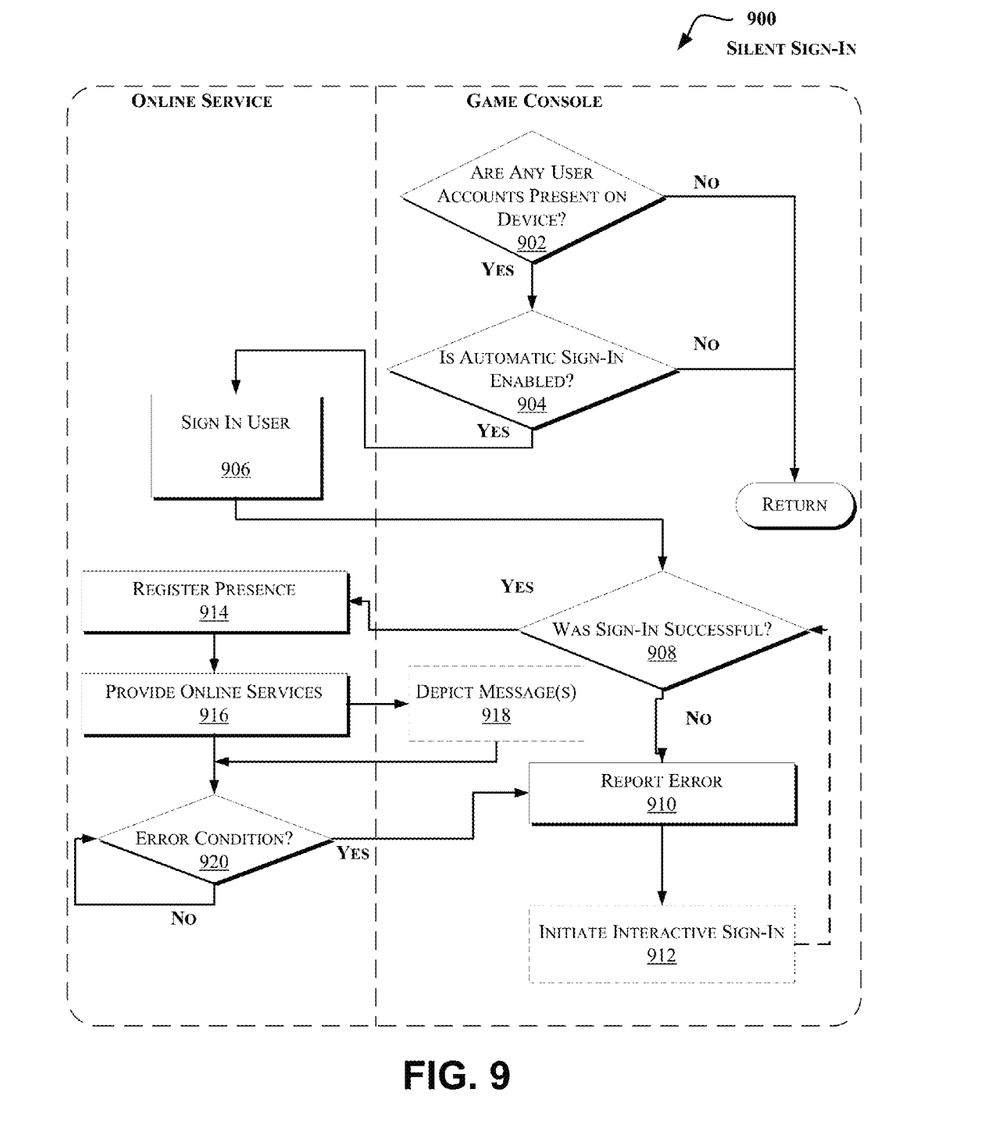
FIG. 9 illustrates an exemplary sign-in method for silently signing in an offline game title online.

FIG. 9 illustrates an exemplary sign-in method 900 for silently signing in an offline game title online. Silently signing in generally indicates that a user of a console (such as the console 102 of FIG. 1) is automatically signed onto an online service (such as those discussed with reference to the data center 110 of FIG. 1). The automatic sign-in process may require no action by a user of a console in one implementation.

In an implementation, each stage discussed with reference to the method 900 is performed by a console (such as the console 102 of FIG. 1) or an online service (such as that discussed with reference to the data center 110 of FIG. 1). Also, each stage may be performed by software, hardware, firmware, or combinations thereof. The method includes a stage 902 which determines whether any user online accounts are present on the console. If an account is present, a stage 904 determines whether automatic sign-in is enabled on the console. Automatic sign-in may be enabled in a corresponding user-configurable setting (such as that discussed with reference to FIG. 2). If stages 902 or 904 fail, the method 900 will return to a previous state. In case of failure of stages 902 or 904, an error message regarding lack of an account or automatic sign-in disablement may be generated, respectively.

Otherwise, if the stage 904 determines that automatic sign-in is enabled, the saved user information is utilized to sign in the user (906) as discussed with reference to FIG. 2 (for example, a stage such as 206 may initiate the sign in process on the game console side (not shown)). After the user successfully signs into the online service, a stage 908 determines whether the sign-in stage 906 was successful. If the stage 906 was unsuccessful, a stage 910 reports an error (e.g., by displaying an error in a user interface which may optionally provide further processing). In one implementation, the error message indicates that passcode is required or sign-in has failed. Also, the stages 908 and 910 may be performed by the game console, online service, or combinations thereof. An optional stage 912 may initiate an interactive sign-in. The optional stage 912 may be initiated by the user. The interactive sign-in may also request that the user provide a user name (e.g., a gamertag) in addition to an authorization code such as discussed with reference to FIG. 8. After the stage 912, the method 900 resumes with the stage 908.

If sign-in was successful (i.e., the "Yes" branch from block 908), the data center 110 registers presence of the console 102 (stage 914). The presence registration allows the provision of online services (916) (e.g., providing the user of the console 102 with access to in-game notifications, cross-title game invitations, friend requests, data corresponding to a friends list, and the like). Accordingly, the stage 916 may be optionally followed by a stage 918 which depicts the messages on a console (such as notifications on the console 102 of FIG. 1) or a display device attached to the console. In one implementation, the stage 908 is performed by the presence server(s) 116 of FIG. 1. The stage 916 is followed by a stage 920 which senses error conditions (such as unplugging of a cable which may be sensed by the console 102). In case of error, the method 900 continues with the stage 910.

In one implementation, the stages 902, 904, 908, 910, 912, and 920 are performed by a console such as the console 102 of FIG. 1. In an alternative implementation, the stages 906, 908, 910, 912, 914, 916, and 920 are performed by a server such as those discussed with reference to the data center 110 of FIG. 1.

Exemplary API

An API may be utilized to provide silent sign-in of a most recently logged on account automatically. Such an API may enable developers to quickly implement a silent sign-in UI for offline game titles for example.

In implementations involving an Xbox game console (provided by Microsoft Corporation of Redmond, Wash.), XOnlineSilentLogon application programming interface (API) may be utilized to enable applications (which are capable of silent sign-in) to automatically sign in the most recently signed in account, assuming there is no passcode on the account and automatic sign-in is enabled on the game console. In an alternate implementation, a controller coupled to the gaming device can provide specific user account information to sign in the user account onto the online service instead of the most recently signed in user account.

This API is similar to XOnlineLogon except that it does not require any user information. The most recently logged on account is automatically picked by the API. If the most recently logged on account fails, the API will not retry with any other account information that may be on the console.

An implementation of this API is reproduced below:

```
HRESULT XOnlineSilentLogon(
    IN const DWORD* pdwServiceIDs,
    IN DWORD cServices,
    IN HANDLE hEvent,
    OUT PXONLINETASK_HANDLE pHandle
);
```

In case of failure, the API may return the following silent sign-in specific errors:

```
XONLINE_E_SILENT_LOGON_DISABLED
XONLINE_E_SILENT_LOGON_NO_ACCOUNTS
XONLINE_E_SILENT_LOGON_PASSCODE_REQUIRED
```

General Computing Environment

Figure 10:
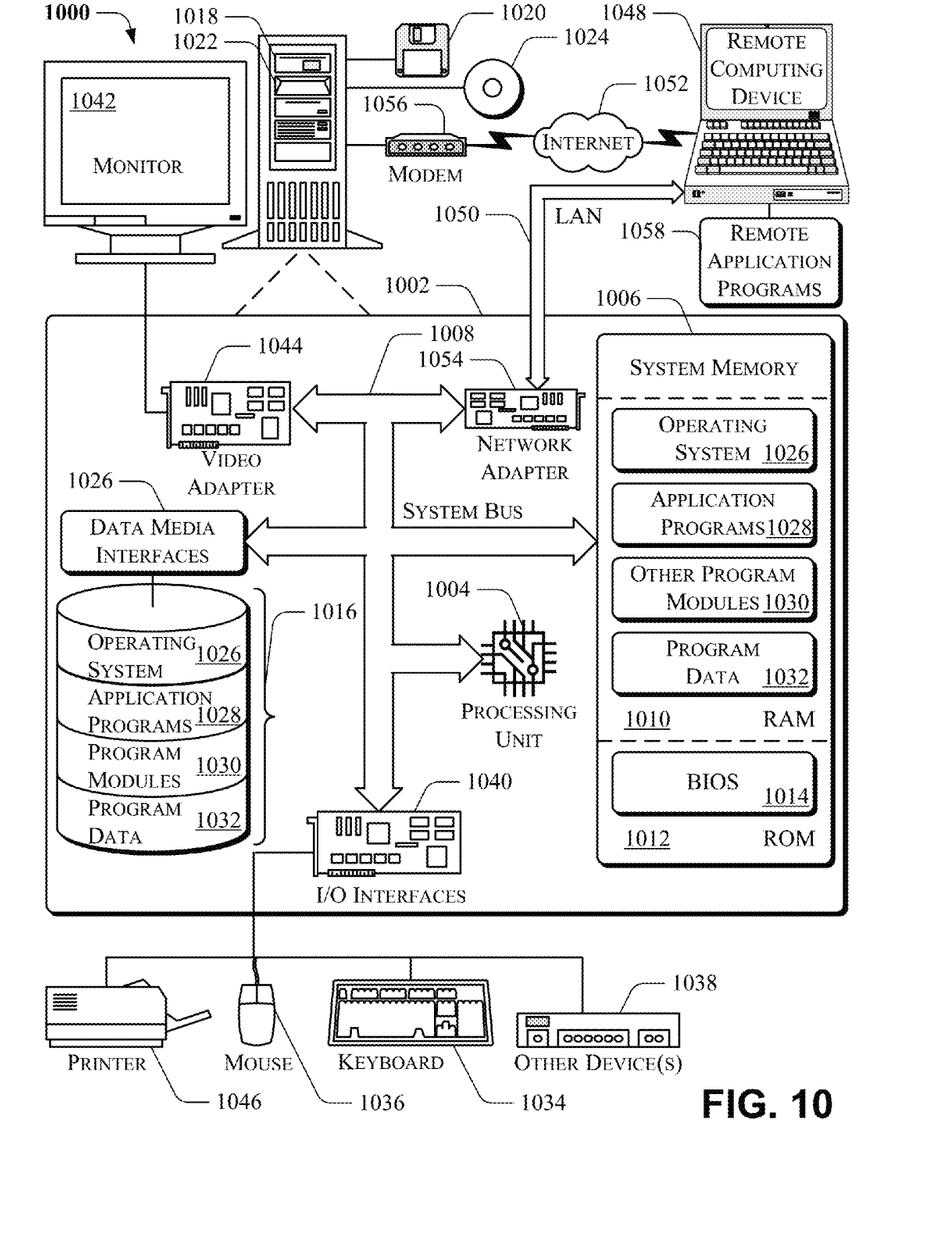
FIG. 10 illustrates a general computing environment, which can be used to implement the techniques described herein.

FIG. 10 illustrates a general computing environment 1000, which can be used to implement the techniques described herein. The computer environment 1000 may be utilized to implement one or more of the servers or gateways discussed with reference to FIG. 1 (such as those within the data center 110). The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the exemplary computer environment 1000.

Computer environment 1000 includes a general-purpose computing device in the form of a computer 1002. The components of computer 1002 can include, but are not limited to, one or more processors or processing units 1004 (optionally including a cryptographic processor or co-processor), a system memory 1006, and a system bus 1008 that couples various system components including the processor 1004 to the system memory 1006.

The system bus 1008 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1002 typically includes a variety of computer-readable media. Such media can be any available media that is accessible by computer 1002 and includes both volatile and non-volatile media, removable and non-removable media.

The system memory 1006 includes computer-readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 may also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by one or more interfaces (not shown).

The disk drives and their associated computer-readable media provide non-volatile storage of computer-readable instructions, data structures, program modules, and other data for computer 1002. Although the example illustrates a hard disk 1016, a removable magnetic disk 1020, and a removable optical disk 1024, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computer 1002 via the input/output interfaces 1040.

Computer 1002 can operate in a networked environment using logical connections to one or more remote computers, such as a remote computing device 1048. By way of example, the remote computing device 1048 can be a personal computer, portable computer, a server, a router, a network computer, a peer device or other common network node, game console, and the like. The remote computing device 1048 is illustrated as a portable computer that can include many or all of the elements and features described herein relative to computer 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which can be internal or external to computer 1002, can be connected to the system bus 1008 via the input/output interfaces 1040 or other appropriate mechanisms. It is to be appreciated that the illustrated network connections are exemplary and that other means of establishing communication link(s) between the computers 1002 and 1048 can be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components such as the operating system are illustrated herein as discrete blocks, although it is recognized that such programs and components reside at various times in different storage components of the computing device 1002, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Components of Game Console

Figure 11:
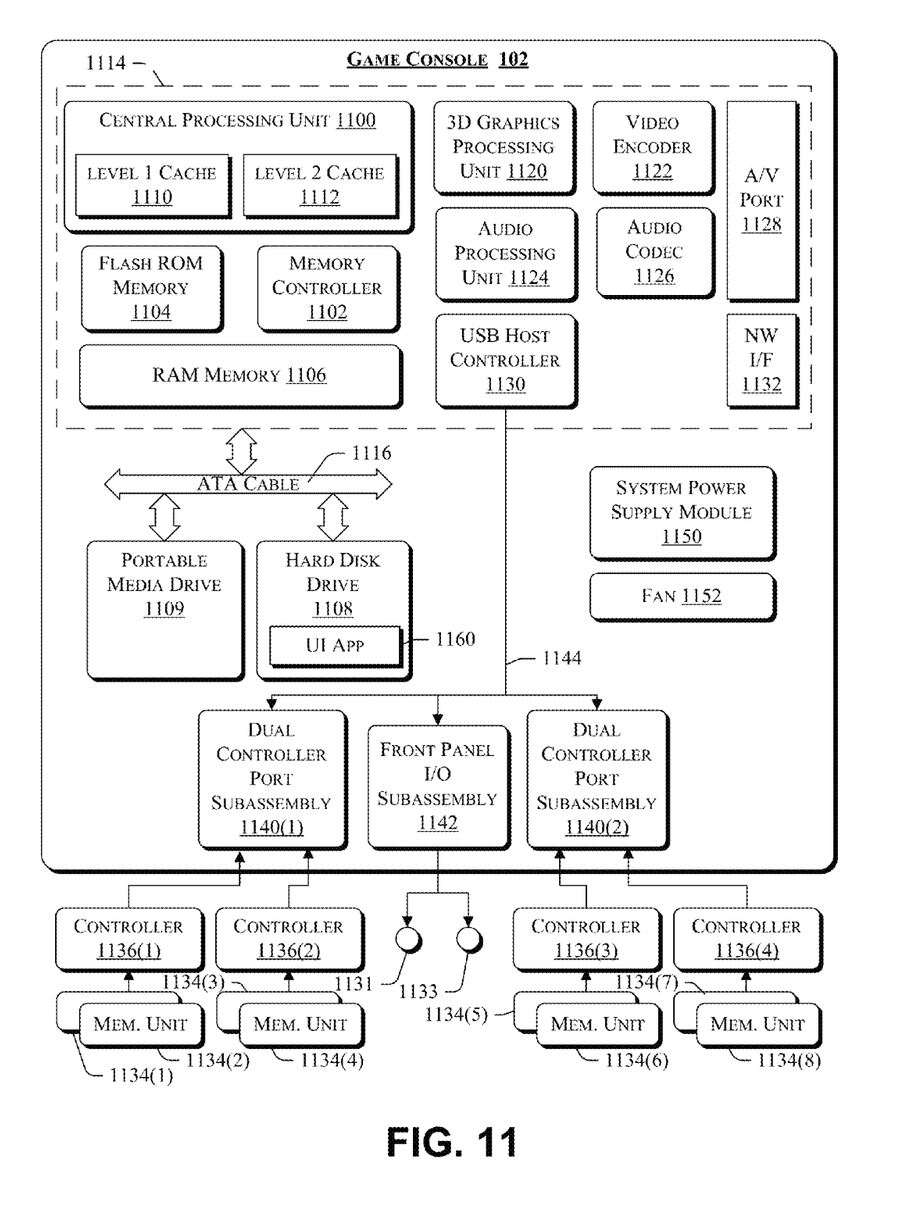
FIG. 11 shows functional components of a game console in more detail.

FIG. 11 shows functional components of a game console 102 in more detail. Game console 102 has a central processing unit (CPU) 1100 and a memory controller 1102 that facilitates processor access to various types of memory, including a flash ROM (Read Only Memory) 1104, a RAM (Random Access Memory) 1106, a hard disk drive 1108, and a portable media drive 1109. CPU 1100 is equipped with a level 1 cache 1110 and a level 2 cache 1112 to temporarily store data and hence reduce the number of memory access cycles, thereby improving processing speed and throughput.

CPU 1100, memory controller 1102, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 1100, memory controller 1102, ROM 1104, and RAM 1106 are integrated onto a common module 1114. In this implementation, ROM 1104 is configured as a flash ROM that is connected to the memory controller 1102 via a PCI (Peripheral Component Interconnect) bus and a ROM bus (neither of which are shown). RAM 1106 is configured as multiple DDR SDRAM (Double Data Rate Synchronous Dynamic RAM) that are independently controlled by the memory controller 1102 via separate buses (not shown). The hard disk drive 1108 and portable media drive 1109 are connected to the memory controller via the PCI bus and an ATA (AT Attachment) bus 1116.

A 3D graphics processing unit 1120 and a video encoder 1122 form a video processing pipeline for high speed and high resolution graphics processing. Data is carried from the graphics processing unit 1120 to the video encoder 1122 via a digital video bus (not shown). An audio processing unit 1124 and an audio codec (coder/decoder) 1126 form a corresponding audio processing pipeline with high fidelity and stereo processing. Audio data is carried between the audio processing unit 1124 and the audio codec 1126 via a communication link (not shown). The video and audio processing pipelines output data to an A/V (audio/video) port 1128 for transmission to the television or other display. In the illustrated implementation, the video and audio processing components 1120-828 are mounted on the module 1114.

Also implemented on the module 1114 are a USB host controller 1130 and a network interface 1132. The USB host controller 1130 is coupled to the CPU 1100 and the memory controller 1102 via a bus (e.g., PCI bus) and serves as host for the peripheral controllers 1136(1)-1136(4). The network interface 1132 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 1140(1) and 1140(2), with each subassembly supporting two game controllers 1136(1)-1136(4). A front panel I/O subassembly 1142 supports the functionality of a power button 1131 and a media drive eject button 1133, as well as any LEDs (light emitting diodes) or other indicators exposed on the outer surface of the game console. The subassemblies 1140(1), 1140(2), and 1142 are coupled to the module 1114 via one or more cable assemblies 1144.

Eight memory units 1134(1)-1134(8) are illustrated as being connectable to the four controllers 1136(1)-1136(4), i.e., two memory units for each controller. Each memory unit 1134 offers additional storage on which games, game parameters, and other data may be stored. When inserted into a controller, the memory unit 1134 can be accessed by the memory controller 1102.

A system power supply module 1150 provides power to the components of the game console 102. A fan 1152 cools the circuitry within the game console 102.

A console user interface (UI) application 1160 is stored on the hard disk drive 1108. When the game console is powered on, various portions of the console application 1160 are loaded into RAM 1106 and/or caches 1110, 1112 and executed on the CPU 1100. Console application 1160 presents a graphical user interface that provides a consistent user experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 1100, or in software stored on the hard disk drive 1108 that executes on the CPU, so that the CPU is configured to perform the cryptographic functions. Alternatively, a cryptographic processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 1132, game console 102 may further be operated as a participant in online gaming, as discussed above.

It should be noted that although the game console discussed herein is described as a dedicated game console (not a general-purpose PC running computer games), the game console may also incorporate additional functionality. For example, the game console may include digital video recording functionality so that it can operate as a digital VCR, the game console may include channel tuning functionality so that it can tune and decode television signals (whether they be broadcast signals, cable signals, satellite signals, etc.), and so forth. Further, in alternate implementations, the game console is replaced with a set top box or other computing device.

CONCLUSION

Thus, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:
1. A method comprising:
   identifying, by a game console, at least one user account present on the game console during use by a user of an offline game title on the game console;
   determining, by the game console, that automatic sign-in is enabled on the game console for the at least one user account identified;
   identifying, by the game console, a most-recently-signed-in user account of the at least one user account as a specific user account to be silently signed in;
   silently signing in, by the game console, the specific user account to an online service automatically without requiring action by the user of the offline game title on the game console for effecting the silently signing in;

determining, by the game console, that the user has been silently signed in; and based at least in part on the determining that the user has been silently signed in, providing the user with access to online services during the use of the offline game title.

2. The method according to claim 1, wherein the online services comprise at least one of:

access to an in-game notification;

access to a friend request inviting the user to become a friend of another user; or access to data corresponding to a friends list.

3. The method according to claim 1, wherein:

the online services comprise access to a cross-title game invitation that enables the user to switch from the offline game title to an online game;

the offline game title is played by one or more players with access to the game console; and the online game allows the user to play the online game against one or more other players online.

4. The method according to claim 1, further comprising generating a menu by the offline game title running on the game console, wherein the menu includes a status of the signing in.

5. The method according to claim 1, further comprising:

generating a menu by the offline game title running on the game console, and providing access to communicate online with other users and a status of the other users as to whether the other users are online or offline using the menu.

6. The method according to claim 1, wherein the silently signing in comprises:

opening a secure communication channel between the game console and a security gateway of a data center;

transmitting data packets between the game console and the data center via the security gateway;

registering a presence of the specific user account with a presence server inside the data center; and providing the user of the offline game title on the game console with access to the online services available from the data center during the use of the offline game title.

7. The method according to claim 6, further comprising:

partially encrypting the data packets comprising voice data and other data, the partially encrypting comprising encrypting the other data without encrypting the voice data; and communicating the voice data and the other data over the secure communication channel between the game console and the data center using the partially encrypted data packets.

8. The method according to claim 1, further comprising registering an online presence of the signed-in specific user account, wherein the registering comprises holding and processing data concerning the online presence of the signed-in specific user account at a server for online gaming.

9. The method according to claim 1, further comprising:

generating, by the offline game title, an interface configured to communicate with an online game service via a public network; and using the interface generated by the offline game title to perform the silently signing in.

10. A game console comprising:

one or more processors;

one or more computer storage hardware devices storing executable instructions that, when executed by the one or more processors, cause the one or more processors to perform operations comprising:

identifying at least one user account present on the game console during use by a user of an offline game title on the game console;

determining that automatic sign-in is enabled for the at least one user account identified, wherein a most-recently-signed-in user account is identified as a specific user account for signing in;

determining that a controller is in communication with the game console, the controller including a memory unit having account information corresponding to the specific user account identified on the game console for signing in;

silently signing in the specific user account to an online service based on the account information determined to be in the memory unit of the controller without requiring action by the user of the offline game title on the game console for effecting the signing in;

determining that the user has been silently signed in; and based at least in part on the determining that the user has been silently signed in, providing the user with access to online services during use of the offline game title.

11. The game console according to claim 10, wherein:

the online services comprise access to a cross-title game invitation that enables the user to switch from the offline game title to an online game;

the offline game title is played by one or more players with access to the game console; and the online game allows the user to play the online game against one or more other players online.

12. The game console according to claim 10, the operations further comprising generating a menu by the offline game title running on the game console, wherein the menu includes a status of the signing in.

13. The game console according to claim 10, the operations further comprising:

generating a menu by the offline game title running on the game console, and providing access to communicate online with other users and a status of the other users as to whether the other users are online or offline using the menu.

14. The game console according to claim 10, wherein the silently signing in includes operations further comprising:

opening a secure communication channel between the game console and a security gateway of a data center;

transmitting data packets between the game console and the data center via the security gateway;

registering a presence of the specific user account with a presence server inside the data center; and providing the user of the offline game title on the game console with access to the online services available from the data center during use of the offline game title.

15. A method comprising:

determining, by a game console and based at least in part on account information included in a controller that is coupled to the game console, that automatic silent sign-in is enabled for a user account of a user of an offline game title running on the game console and that the user account corresponds to the account information included in the controller;

based at least in part on the determining that the automatic silent sign-in is enabled, silently signing in the user account to an online service without requiring action by the user of the offline game title during use by the user of the offline game title for effecting the silently signing in;

determining, by the name console, that the user has been silently signed in; and based at least in part on the determining that the user has been silently signed in, registering an online presence of the signed-in user account at a server for online gaming.

16. The method according to claim 15, further comprising receiving, during the use of the offline game title, at least one of:

an in-game notification;

a friend request inviting the user to become a friend of another user;

data corresponding to a friends list; or a cross-title game invitation that enables the user to switch from the offline game title to an online game.

17. The method according to claim 15, further comprising generating a menu by the offline game title running on the game console, wherein the menu includes a status of the signing in.

18. The method according to claim 15, further comprising generating a menu by the offline game title running on the game console, and providing access to communicate online with other users and a status of the other users as to whether the other users are online or offline using the menu.

19. The method according to claim 15, further comprising:

generating, by the offline game title, an interface configured to communicate with an online game service via a public network; and using the interface generated by the offline game title to perform the silently signing in.

* * * * *